May 24, 1938.　　　C. M. HOLTON　　　2,118,045
ARTIFICIAL HORIZON
Filed Oct. 2, 1935　　　3 Sheets-Sheet 1

INVENTOR
C. M. HOLTON
BY Harold Dodd,
ATTORNEY

May 24, 1938.  C. M. HOLTON  2,118,045
ARTIFICIAL HORIZON
Filed Oct. 2, 1935  3 Sheets-Sheet 3
Fig. 3.
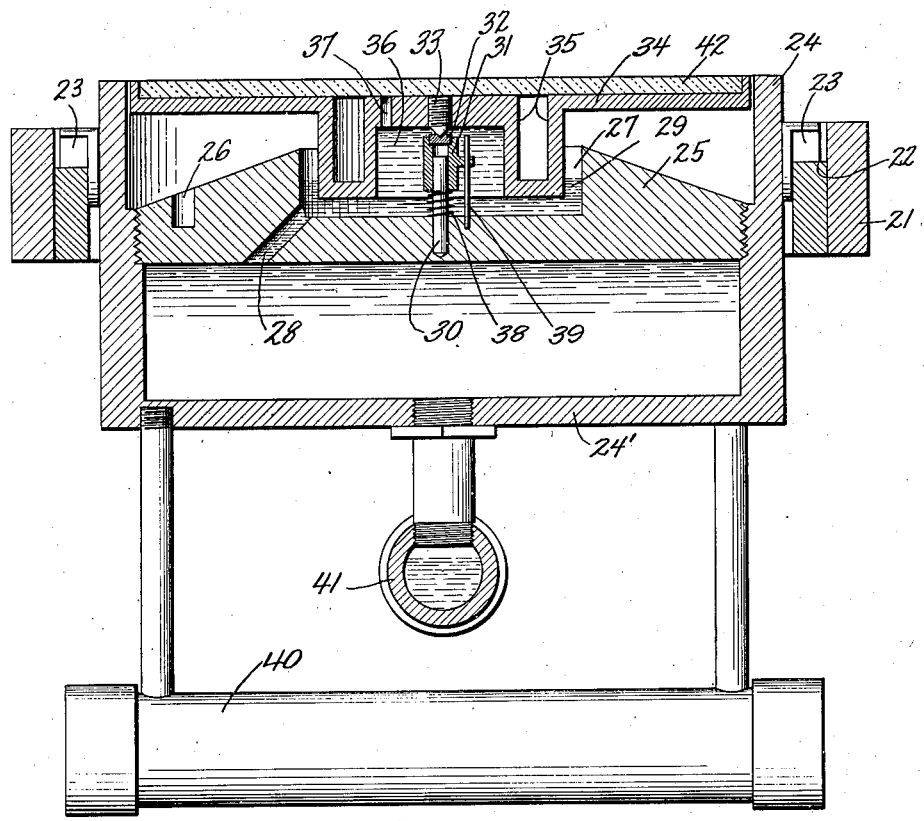
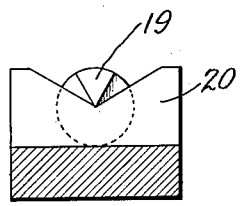
Fig. 4.
INVENTOR
C. M. HOLTON
BY
Harold Dodd
ATTORNEY Patented May 24, 1938

2,118,045

UNITED STATES PATENT OFFICE 2,118,045

ARTIFICIAL HORIZON

Chester M. Holton, United States Navy

Application October 2, 1935, Serial No. 43,139

11 Claims. (Cl. 88—1)

(Granted under the act of March 3, 1883, as amended April 30, 1928; 370 O. G. 757)

This invention relates to a device for providing a reference plane in taking observations on heavenly bodies for navigating when the natural horizon is obscured or, for any reason, may not be conveniently used.

It is the object of this invention to provide a device of the type mentioned which has a reflecting surface that is maintained in an accurately horizontal position regardless of angular movements of the platform on which it is mounted and which has compensating means to apply righting torques that increase substantially proportionally to the increase in the torque tending to tilt the reflecting surface.

In the drawings:

Fig. 3 is a sectional view taken on the line 3—3' Fig. 1, through the mirror and the supports therefor and on the line 3'—3' through the parts below those mentioned;

Fig. 4 is a detailed view of a knife edge fulcrum and supporting V block.

I am aware that there have been many artificial horizons devised heretofore but all of those with which I am acquainted depend upon the action of a gyroscope or they are of the bubble or the solid pendulum type. The present invention utilizes pendulous members that apply righting torques that vary as the tilting torque changes.

Figure 1:
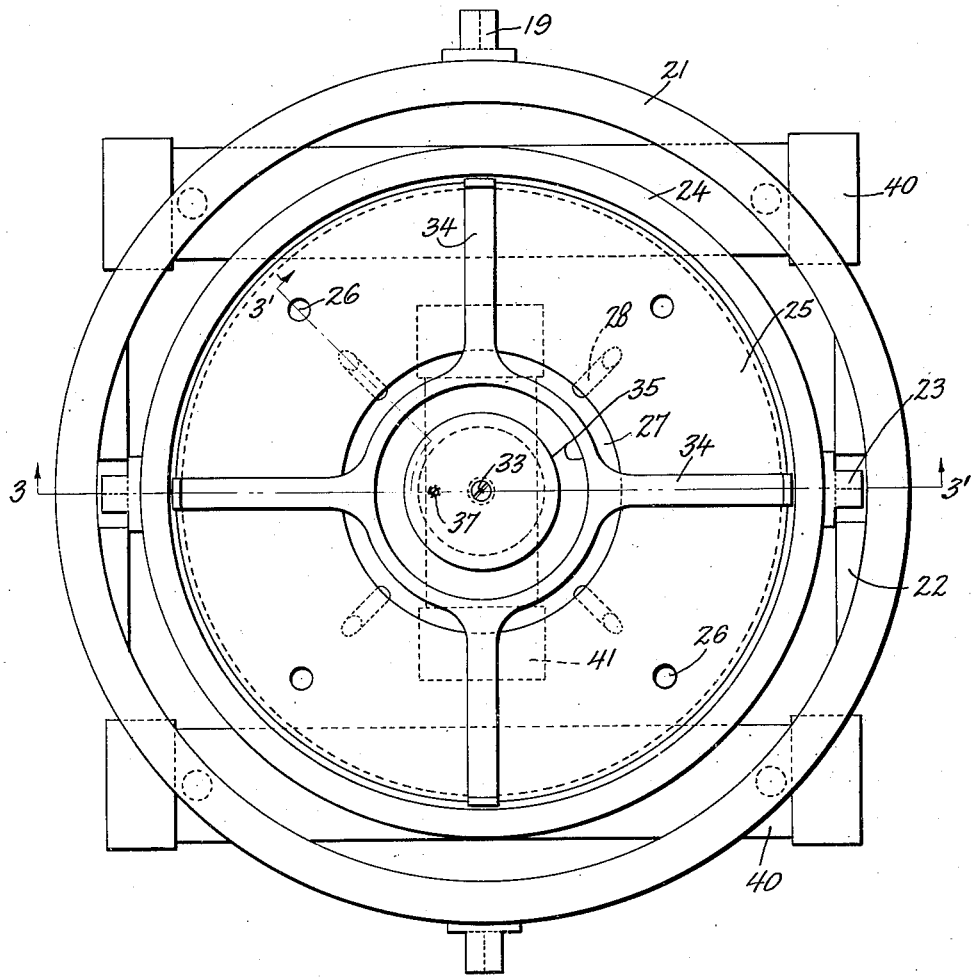
Fig. 1 is a top plan view of my invention apart from the supporting means therefor and with the mirror removed.
Figure 2:
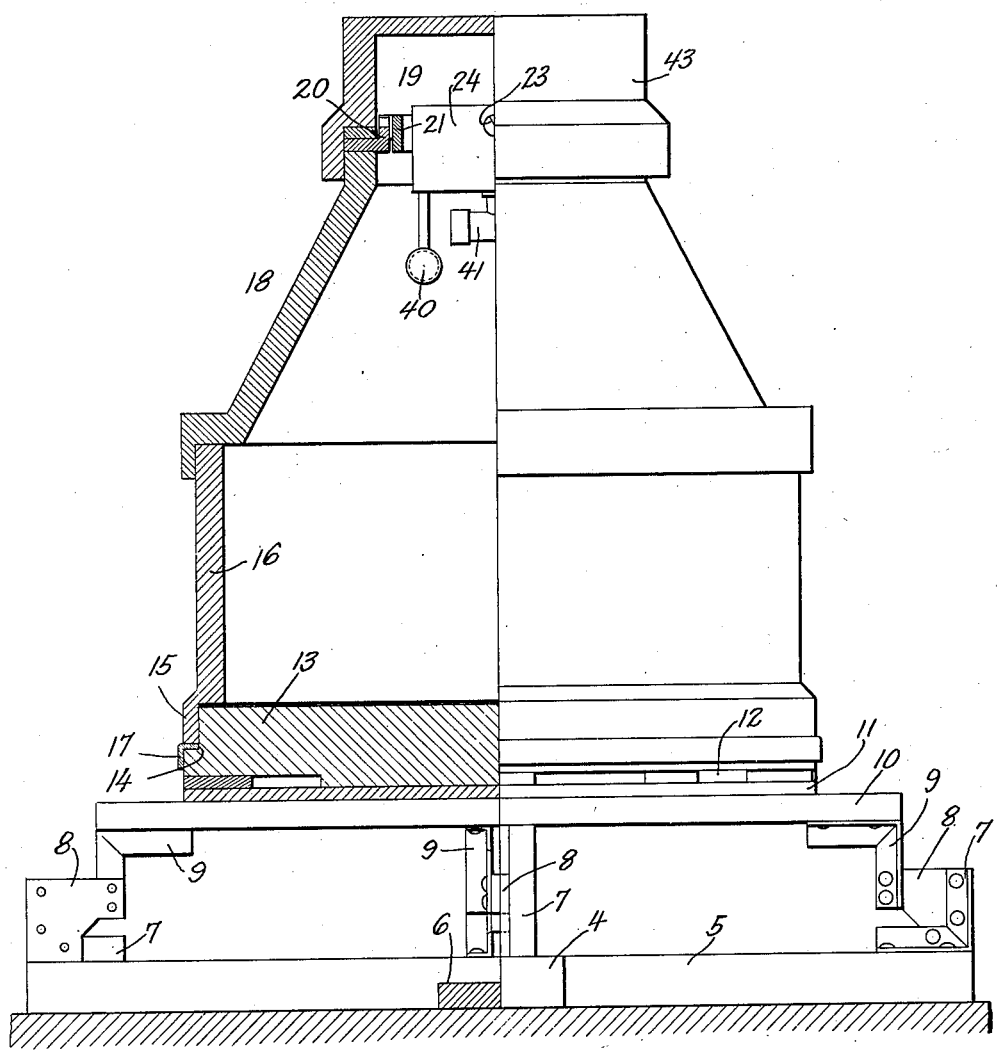
Fig. 2 is a side elevational view, partly in section, of the entire assembly.

In Fig. 2 the footing of the device is composed of two members 4 and 5 at right angles to each other and preferably mortised together as shown in base in Fig. 2. At each end of each of the said members 4 and 5 is a right angle bracket 7 having two parts between which is clamped a rubber cantilever block 8 to the other end of which is secured a double bracket 9. On rigid annulus 10 is disposed a body 11 of sponge rubber upon which are laid a plurality of blocks 12 of felt or the like. Seated upon the felt blocks 12 and the sponge rubber 11 is a member 13 having a rabbet 14 in its periphery to receive in telescoped relation the flange 15 of a cylindrical member 16, felt 17 being interposed between the end face of flange 15 and the one shoulder of the rabbet 14. A substantially frusto-conical member 18 is seated upon the cylindrical member 16, this shape being desirable because it provides a broad base for the assembly and hence increases its stability. The several vibration absorbing bodies of rubber and felt prevent the transmission of vibration from the ship's deck to the instrument proper.

The knife edge fulcra 19 in V blocks 20 support a ring 21 while leaving it free to tilt without friction about the axis defined by the knife edges. At right angles to the axis of the members 19 V blocks 22 are fixed in ring 21 and seated therein are the knife edge fulcra 23 for cylinder 24 which has a closed lower end 24'. (See Fig. 3.) The member 25 is screwed into the cylinder 24 by means of a spanner engaged with the holes 26. This member has a cavity 27 extending downwardly from its upper face, which cavity is in communication with the space in cylinder 24 below the member 25 by means of ducts 28 whereby the mercury 29 with which the space below member 25 is filled may rise freely into the cavity 27 as a continuous body.

Centrally disposed in the cavity 27 and seated in a hole in member 25 is a pin 30 upon which is slidably mounted a sleeve 31 having fixed in its upper end a jewel bearing 32 whereon is seated the hard point of a stud 33 secured in four armed spider 34. This spider has a centrally positioned double walled portion 35 which defines a downwardly opening cup shaped recess 36 which is completely filled with mercury. Removing air tight plug 37 and pressing the spider down until mercury flows through the plug opening, replacing the plug and removing mercury from the cavity 27 down to the desired level causes the recess 36 to be kept full of mercury by atmospheric pressure and maintains the level of the mercury therein above the surface of the mercury in cavity 27. This construction makes the center of the spider heavy and gives to it a pendulum action due to the weight of the mercury below the point of support of the spider. To insure that the bearing 32 will follow the point 33 when the mercury expands and lifts the spider a spring 38 is placed around the stud 30 to exert a moderate upward pressure on the sleeve 31 and the guide 39 is provided to increase the lateral stability of the sleeve when it is high upon the stud and it may be headed at its upper end to prevent the sleeve being displaced entirely from the stud. It will be seen that this construction results in the spider 34 being in part supported by its buoyancy in the fluid in cavity 27 and in part on bearing 32, and that the bearing serves also to keep the spider properly centered.

Suspended from the closed end 24' of cylinder 24 are two tubes 40 which are parallel to each other and to the axis of knife edges 23 and are the same distance from the end 24'. The tubes

40 are partially filled with mercury. The tube 41, likewise partly filled with mercury is parallel to the end 24' but at right angles to the tubes 40 and at less distance from the end 24' than the tubes 40. Since the instrument will be used on a ship its tilting axes will be above the axis of roll or the axis of pitch of the vessel and therefore rolling or pitching will impart a strong horizontal component of movement to the instrument as a whole. Owing to the inertia and mobility of the mercury it will tend to move in the tubes 40 and 41 relatively to the tubes in a direction opposite to the direction of action of the accelerating forces and will thereby apply an increasing righting torque to the cylinder 24 and insure the horizontality of the plane mirror 42 on the spider 34. It is apparent that owing to the action of the suspended tubes 40 and 41 and the body of liquid in cylinder 24, all of which is below the supporting axis of the cylinder, the entire assembly immediately associated with the mirror 42 will be strongly pendulous and yet will be damped by the above described movement of the mercury. Further, the mass of the mercury in the recess 36 together with the resistance of the double walls 35 in moving through the mercury in cavity 27 will apply separate damping forces to tilting of mirror 42 about the one point support 33.

A cap 43 is provided to complete the enclosure of the interior and to protect the apparatus from the weather.

My artificial horizon is used for taking the sight by bringing the image of the heavenly body down to the mirror 42 by means of a sextant in the same manner as it is brought down to the natural horizon when the natural horizon is the plane of reference. The only corrections necessary are for parallax and refraction but these are small, the corrections for dip and height of eye necessary when sighting on the sea horizon being eliminated.

It will be observed that my device is fundamentally three strongly damped pendulums, namely, the tubes 40 and 41, the body of mercury in cylinder 24 below member 25, and the body of mercury in the recess 36. Any tilting not compensated by the action of the first two will be overcome by the movement of spider 34 on its pivotal support and hence the surface of mirror 42 will be kept accurately horizontal. For example, sights taken from a 40 ft. motor-sailer going ahead slowly in a choppy harbor and a 20 knot wind, gave a position line only one minute in error. One of the great advantages of my invention is that it may be used at night when the heavenly bodies most frequently used in navigation are readily visible and also when the natural horizon is obscurred.

While mercury has been mentioned it is to be understood that any other suitable liquid may be used in its stead but the mercury is preferred owing to its high specific gravity and the quickness of its action.

The invention described herein may be manufactured and used by or for the Government of the United States of America for governmental purposes without the payment of any royalties thereon or therefor.

I claim:

1. An artificial horizon device, comprising a vibration damping base structure, a Cardan ring mounted therein on substantially frictionless supports, a cylinder having one closed end mounted in said ring, two tubes partially filled with mercury suspended from the closed end of said cylinder at the same distance from the cylinder, parallel to the said closed end and to each other, a third tube partially filled with mercury suspended from said closed end parallel thereto and at right angles to the said two tubes but nearer to the said end than the two tubes, a member provided with a cup-shaped cavity extending from its upper surface secured in said cylinder intermediate the ends of the cylinder, there being ducts extending from said cavity to the lower face of said member, a body of mercury in said cylinder below said member which is continuous through said ducts into said cavity partially to fill said cavity, a spider, said spider having a double walled annular hub portion with a closed end extending into the mercury in said cavity and forming a downwardly open cup which is filled with mercury, a jewel pedestal resiliently mounted in said cavity for sliding movement in a vertical direction, a suspension for said spider having a hard point resting upon said pedestal, and a plane mirror carrier by said spider.

2. An artificial horizon device, comprising a vibration damping base structure, a Cardan ring mounted therein on substantially frictionless supports, a cylinder having one closed end mounted in said ring on like supports at right angles to the supports of said ring, two weight members suspended from said closed end, said weights being adapted to exert a righting torque on said cylinder in opposition to a torque tending to tilt said cylinder about an axis not passing through the device, the magnitude of said righting torque being a function of the magnitude of the tilting torque, a third weight suspended from the said end having like properties and disposed to act at right angles to the said two weights, a member provided with a cup-shaped cavity extending from its upper surface secured in said cylinder intermediate the ends of the cylinder, there being ducts extending from said cavity to the lower face of said member, a body of liquid in said cylinder below said member which is continuous through said ducts into said cavity partially to fill said cavity, a spider, said spider having a double walled annular hub portion with a closed end extending into the liquid in said cavity and forming a downwardly open cup which is filled with liquid, a jewel pedestal resiliently mounted in said cavity for sliding movement in a vertical direction, a suspension for said spider having a hard point resting upon said pedestal, and a plane mirror carried by said spider.

3. An artificial horizon device, comprising a vibration damping base structure, a Cardan ring mounted therein on substantially frictionless supports, a cylinder having one closed end mounted in said ring on like supports at right angles to the supports of said ring, means carried by said end to exert a righting torque on said cylinder in opposition to a torque tending to tilt said cylinder about an axis not passing through the device, the magnitude of said torque being a function of the magnitude of the tilting torque, other means similar to the aforesaid means disposed to act transversely to the line of action of the aforesaid means, a member provided with a cup-shaped cavity extending from its upper surface secured in said cylinder intermediate the ends of the cylinder, there being ducts extending from said cavity to the lower face of said member, a body of liquid in said cylinder below said member continuous through said ducts into said cavity partially to fill said cavity, a spider, said spider having a double walled annular hub portion with a closed end extending into the liquid in said cavity and forming a downwardly opening cup which is filled with said liquid, a jewel pedestal resiliently mounted in said cavity for sliding movement in a vertical direction, a suspension for said spider having a hard point resting upon said pedestal, and a plane mirror carried by said spider.

4. An artificial horizon device, comprising a universally tiltable mounting, a cylinder having one end closed carried thereby, a member provided with an upwardly opening cup-shaped cavity mounted in said cylinder intermediate the ends of said cylinder, there being ducts in said member extending from said cavity to the lower face of said member, a spider having a downwardly opening cup-shaped portion disposed in said cavity, a one-point frictionless suspension for supporting said spider from said member, a plane mirror carried by said spider, a body of fluid in said cylinder continuous through said ducts into said cavity, partially filling said cavity and completely filling said cup-shaped portion of the spider, the fluid in said cup-shaped portion being retained by atmospheric pressure at a higher level than the surface of the liquid in said cavity, and means to apply righting torques to said cylinder in opposition to torques acting to tilt said cylinder about an axis not passing through the device, the said righting torques automatically varying substantially proportionally to the magnitude of the tilting torques.

5. An artificial horizon device, comprising a plane mirror, a universally tiltable damped pendulous assembly whereon said mirror is mounted, and a vibration absorbing base structure on which all the aforesaid parts are carried, said base including a footing, rubber cantilever blocks secured at one end to said footing, a rigid annulus supported by the said blocks, a body of sponge rubber on said annulus, felt on said sponge rubber, a rigid member disposed on said felt, a pedestal supported on said rigid member and a strip of felt disposed between said pedestal and said rigid member.

6. An artificial horizon device, comprising a plane mirror, a universally tiltable damped pendulous assembly whereon said mirror is mounted, and a vibration absorbing base structure on which all the aforesaid parts are carried, said base including a footing, rubber cantilever blocks secured at one end to said footing, a rigid annulus supported by the said blocks, and a plurality of inelastic bodies interposed between said annulus and other parts of said base.

7. An artificial horizon, comprising a plane reflecting element, a damped pendulous assembly mounted to be universally tiltable, including suspended enclosing members and a body of liquid in each suspended member, said bodies of liquid having somewhat less volume than the respective enclosing member, a member of said assembly having in it a cavity wherein is a body of liquid, and a member on which said element is seated, said second mentioned member being at least in part supported by the liquid in said cavity and having an upwardly extending recess in its central portion in which liquid from said cavity is held by atmospheric pressure at a higher level than the free surface of the liquid in said cavity whereby the mass of the said central portion is increased.

8. An artificial horizon device, comprising a damped pendulous assembly including suspended enclosing members and a body of liquid in each suspended member, said bodies of liquid having somewhat less volume than the respective enclosing member, a universally tiltable mounting therefor, a spider, a plane mirror on said spider, and means including a body of fluid acting buoyantly on said spider and a one-point frictionless support whereby said spider is mounted on said assembly.

9. Means for establishing a horizontal plane, comprising a damped pendulous assembly mounted to be universally tiltable including suspended enclosing members and a body of liquid in each suspended member, said bodies of liquid having somewhat less volume than the respective enclosing member, a damped pendulous supporting member carried by said assembly to be universally tiltable with respect to said assembly, and a plane reflecting element on said supporting member.

10. Means for establishing a horizontal plane, comprising a plane member, and a series of three damped pendulous devices mounted to be universally tiltable and operatively associated with said member to exert on said member the sum of their stabilizing effects, each of said devices comprising an elongated enclosing member and a body of liquid therein of somewhat less volume than the enclosing member, two of said devices extending substantially at right angles to the third device.

11. An artificial horizon device, comprising a damped pendulous assembly, a universally tiltable mounting therefor, a spider, a plane mirror on said spider, means carried by said assembly constituting a partial support for said spider, a single downwardly extending pointed member fixed to said spider, and a member bearing against said pointed member to cooperate therewith to center said spider on its support, said last mentioned member being vertically slidable and resiliently mounted to adjust to changes in said partial support.

CHESTER M. HOLTON.